Figure 1:
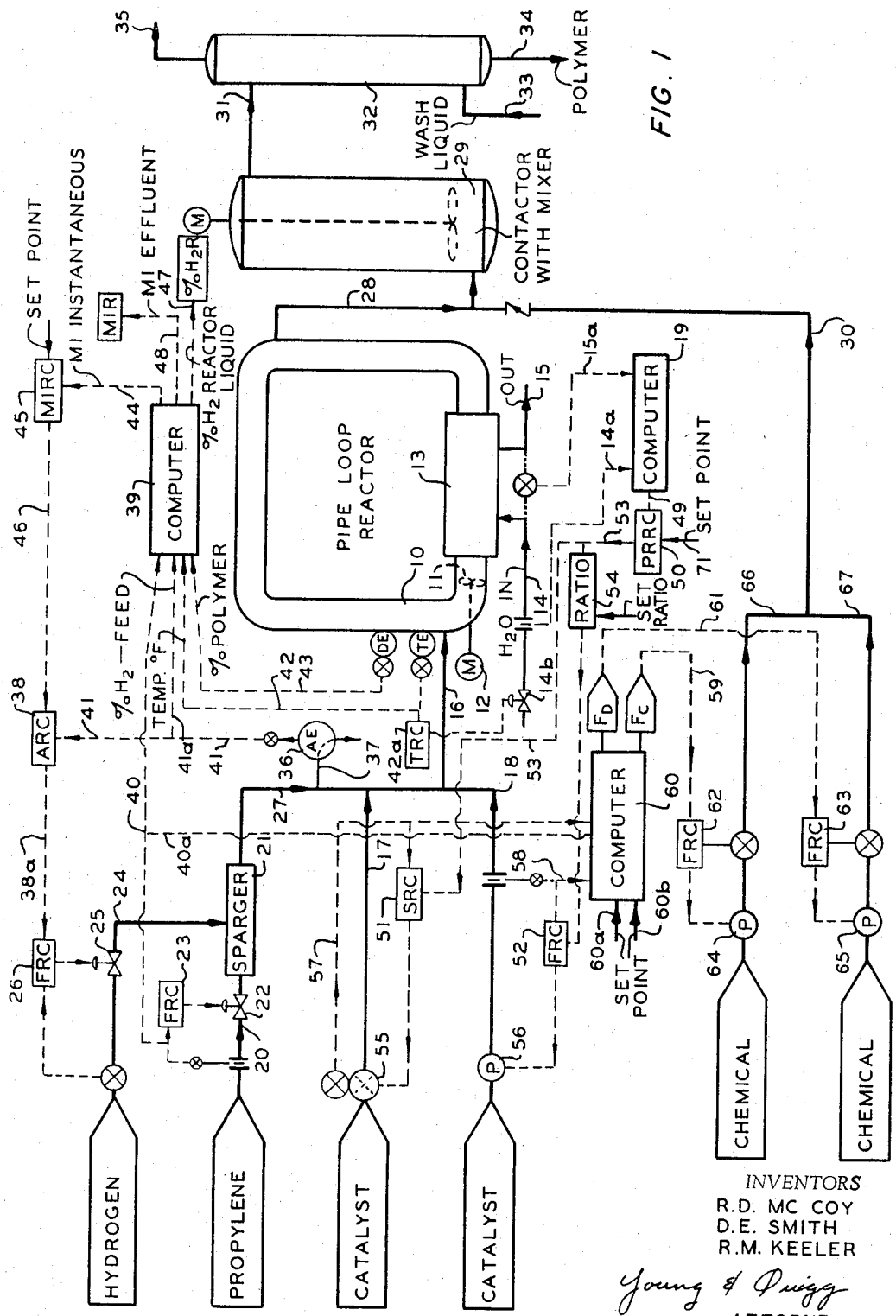

INVENTORS
R.D. MC COY
D.E. SMITH
R.M. KEELER

Young & Quigg
ATTORNEYS

INVENTORS
R.D. MC COY
D.E. SMITH
R.M. KEELER

*Young & Quigg*
ATTORNEYS

INVENTORS
R.D. MC COY
D.E. SMITH
R.M. KEELER

Young & Quigg
ATTORNEYS

United States Patent Office 3,356,667
Patented Dec. 5, 1967

3,356,667
PROCESS CONTROL
Dexter E. Smith, Raymond D. McCoy, and Robert M. Keeler, Bartlesville, Okla., assignors to Phillips Petroleum Company, a corporation of Delaware
Filed Oct. 22, 1963, Ser. No. 318,013
7 Claims. (Cl. 260—93.7)

This invention relates to the control of chemical reactions. In another aspect it relates to a method and apparatus for controlling reaction conditions of an olefin polymerization. In accordance with a further aspect, this invention relates to an improved process for polymerizing olefins, especially propylene, in the presence of a very small controlled amount of hydrogen to produce a solid polymer having very specific and highly desirous properties.

Various methods are known for producing normally solid and semi-solid polymers. Recently, considerable attention has been directed toward the production of solid olefin polymers such as polyethylene and polypropylene. These polymerizations are frequently carried out in the presence of a solid catalyst utilizing a liquid solvent, often the monomer, as the reaction medium. The reactions are also normally exothermic so that it is necessary to provide some means for removing the heat of reaction. Polymer characteristics are often affected by conditions of temperature, polymerization rate, polymer concentration, residence time of materials, and modifier concentration, e.g., hydrogen, in the reactor, since these conditions play a significant part in determining the average molecular weight and/or molecular weight distribution or other property of the product. Polymer melt index, such as a melt index value determined by the ASTM Method D-1238-57T, "Measurement of the Flow Rate of Thermoplastics by Extrusion Plastometer," which is a property very important to fabricators, is affected to a considerable extent by the reaction temperature and hydrogen concentration in the reaction liquid when polymerizing propylene to form solid polypropylene. It is with the more accurate and reliable control of such polymerization reactions as well as other reactions that this invention is concerned.

It has already been proposed to regulate the melt index, flexural modulus and catalyst productivity in the production of polymers, such as polymers of propylene, by carrying out the polymerization in the presence of a very small concentration of hydrogen as a polymerization modifier. This process, of course, is not free from inconveniences. For example, it is very difficult to keep under control the exact concentration of hydrogen maintained in the liquid phase in the reaction zone and therefore, regulation of the melt index, flexural modulus, and catalyst productivity within the desired limits; flexural modulus and melt index being dependent upon the polymerization temperature and particularly dependent upon the concentration of hydrogen in the reaction medium during polymerization.

According to a preferred embodiment of the invention, there is provided a method for controlling a polymerization reaction for the production of polymers of uniform quality wherein monomer(s), polymerization modifiers and catalyst are fed to a reaction zone from which the heat of reaction is removed and the reaction effluent is withdrawn containing polymer product. Improved control of product properties of such a polymerization reaction is provided by varying or regulating the modifier feed rate (hydrogen for propylene polymerization) to the polymerization zone in response to a modifier analysis of the feed corrected to indicate the modifier concentration in the reaction phase of the reactor. Further, according to the invention the catalyst feed rate to the polymerization reaction is varied in response to and inversely related to changes in polymer production rate within the reactor.

In a more preferred embodiment, further and more complete control of propylene polymer quality is obtained by establishing a first output signal representative of hydrogen concentration in the feed to the polymerization zone, establishing a second output signal representative of the percent solids (polymer solids) in the reaction zone, establishing a third output signal representative of the rate of flow of monomer to the polymerization reaction zone, establishing a fourth output signal representative of the temperature of the reaction mixture within the reaction zone, producing a first control output signal representative of the instantaneous polymer melt index in the reaction mixture in the reaction zone, and varying the rate of hydrogen addition to the reaction zone in response to changes in the thus-determined polymer melt index (instantaneous). By "signal" it is intended to include mechanical, hydraulic, electrical, and pneumatic signals. Also, by reaction zone it is intended to include one or more suitable reactors.

The apparatus employed according to the invention includes in addition to the basic reactor system means for feeding catalyst and reactant materials to the reactor system, means for withdrawing an effluent product stream from the reactor system, and means for removing reaction heat from the reactor system in combination, computing means for establishing an output control signal representative of the instantaneous melt index of the polymer being produced in the reaction mixture, a second output signal representative of the averaged melt index of the polymer in the effllulent product stream removed from the reactor system, a third output signal representative of the averaged percent hydrogen in the reaction mixture within the reactor, and means for applying the output signal representative of the instantaneous polymer melt index for controlling the rate of hydrogen addition to the reactor system so as to yield a polymer product having a predetermined melt index based on a predetermined concentration of hydrogen in the reaction zone. Moreover, according to the invention, means are provided comprising computing means for establishing an output signal representative of polymer production rate and associated means for controlling the rate of addition of catalyst to the reactor in response to the computed production rate. Further, according to the invention, means are provided comprising computing means adapted to perform substantially identical computations for two or more reactors in a reaction system on a "time-sharing" basis.

An object of this invention is to obtain uniform physical properties of polymers and especially to obtain a normally solid polymer product having an essentially constant melt index.

Another object of this invention is to provide method and means for maintaining a substantially uniform modifier concentration in the reaction liquid within a reaction zone so as to produce a product having certain desired properties.

Another object of the invention is to provide an improved process and system for controlling the modifier addition rate, especially hydrogen, and its concentration in process streams and/or reactions utilizing modifiers such as hydrogen.

Further objects and aspects as well as the several advantages of the invention will become apparent to one skilled in the art upon consideration of the accompanying disclosure, the drawings, and the appended claims.

Although an inert liquid diluent is frequently employed in propylene polymerization and other processes, according to a preferred embodiment of the present invention, the polymerization of propylene is carried out with liquid monomer as the reaction medium. Thus, according to the invention, there is provided in a preferred embodiment, a process for homo-polymerization and copolymerization of alpha-olefins, e.g., olefins having from 2 to 8 carbon atoms per molecule, especially propylene, to high molecular weight solid polymers in which the olefin or olefins in the liquid phase, and without the addition of more than small amounts of inert diluent are brought into contact in a reaction zone with an organometallic initiator or other catalyst in the presence of a controlled concentration of hydrogen. Commercially produced olefins contain minor amounts, for example, up to ten percent of inert materials such as paraffinic hydrocarbons, and it is intended that the polymerization of these commercial products are included within the scope of the invention. The term "small amounts of inert diluent" is, therefore, to be taken to mean such amounts of inert diluent as are introduced into the reaction zone by way of inert material in the olefin feed or for ease of handling of the initiator components. However, the invention is also applicable to other polymerizations or processes employing hydrocarbon diluents or solvents.

The process of the invention is particularly applicable to the homopolymerization of propylene and the copolymerization of propylene with 1-butene and/or ethylene. However, the invention is broadly applicable to polymerization processes used to produce a wide variety of polymers such as polymers or copolymers of other mono-olefins such as ethylene, propylene, butylene and the like and also copolymers of mono-olefins and diolefins such as butadiene, isoprene, and the like. It is to be understood that wherever the term "polymer of propylene" or other monomer is used herein, it denotes both homo- and copolymers.

While a wide variety of organometallic systems or solid catalysts can be employed for the polymerization of olefins, particularly propylene, to solid polymers, it is often preferred to use a catalyst which includes a combination of an aluminum alkyl and a titanium halide, preferably a dialkyl-aluminum chloride or bromide, including mixtures of the two halides, in which the alkyl groups have from 1 to 12 carbon atoms each and a titanium chloride. The catalyst system most preferred is a mixture of diethylaluminum chloride and a titanium chloride complex. The titanium chloride complex is preferably an aluminum-reduced titanium tetrachloride formed by reacting aluminum with titanium tetrachloride. The preferred aluminum-reduced $TiCl_4$ can be described as being of the composition $TiCl_3 \cdot XAlCl_3$ in which X is a number in the range of 0.1 to 1.0. A convenient method for the preparation of such a material is by reduction of titanium tetrachloride with metallic aluminum according to the formula

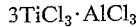

$$3TiCl_3 \cdot AlCl_3$$

This reaction is generally carried out at an elevated temperature, for example, a temperature in the range 300 to 650° F., preferably 375 to 450° F.

The amount of catalyst employed for the polymerization of propylene, for example, when utilizing the above-described organometallic catalyst components can vary over a rather wide range. Generally, the weight ratio of the titanium halide and aluminum alkyl ranges from about 0.5:1 to about 20:1. The amount of catalyst employed can vary substantially but normally about 0.0001 pound of dialkylaluminum chloride are used per pound of propylene feed. The ratio of titanium chloride or complex to diethylaluminum chloride preferably ranges from about 1:1 to about 4.5:1 on a weight basis.

The polymerization of propylene to solid polymer is ordinarily carried out at a temperature ranging from about 80 to about 160° F., preferably from about 90 to about 140° F. The pressure employed in the polymerization zone is preferably at least sufficient to maintain a liquid monomer phase. The residence time for polymerization ordinarily ranges from 5 minutes to 20 hours or longer, preferably from 1 to 5 hours.

As mentioned above, the present invention is carried out in the presence of hydrogen. The concentration of hydrogen employed in the polymerization of propylene must be controlled closely to a given value in order to achieve the desired properties for the propylene polymer product. The hydrogen concentration in the liquid monomer phase in the reaction zone ranges from 0.01 to 0.8 mol percent, preferably from 0.05 to 0.50 mol percent. By carrying out the polymerization of propylene in the presence of hydrogen within the above limits, solid propylene polymers having flexural modulus values of at least 200,000 p.s.i. and melt index values in the range from about 0.1 to about 100, preferably from 1 to 30, and reaction rates greater than 100 weight units of polymer per weight unit of $TiCl_3$ per hour can be achieved.

The solid polymer products, especially the propylene polymer, produced in accordance with this invention, have utility in applications where solid plastics are used. The products can be molded to form articles of any shape, such as bottles and other containers for liquids. Furthermore, the polymer products can be formed into pipe by extrusion.

Suitable solvents for use in the above-described processes in addition to monomer are hydrocarbons which are liquid and chemically inert under reaction conditions. Such solvents include paraffins having 3-12 carbon atoms per molecule and any hydrocarbons having 5 to 6 carbon atoms in a naphthenic ring. Examples of such solvents are isooctane, n-hexane, decane, methylcyclohexane, cyclohexane, and the like. However, as indicated above, it is preferred to use monomer as diluent when polymerizing propylene.

The polymerization reaction being exothermic requires effective measures for removing the heat of reaction. Generally, the reactor is equipped with sufficient agitation means so that conditions of temperature, reactant and catalyst concentration are uniform throughout the reactor. The reactor is also usually equipped with a jacket and cooling coils through which a heat exchange medium is circulated. In some instances, a preferred heat exchange medium is identical to that employed as the reaction medium so that if leaks occur no contamination problem is encountered.

There is considerable heat evolved by the polymerization reaction and the production rate of polymer bears a direct relationship to the heat evolved. Therefore, the rate of product production can be conveniently measured by determining the heat removed from the reactor system. Such heat removal can be computed periodically or continuously and automatically. Production rates can also be computed from a monomer balance around the reactor. Further, instruments such as an infrared analyzer, mass spectrometer, gas chromatograph or the like, can be adapted to analyze for any of the polymerizable monomers which are within the scope of this invention. Hydrogen concentration analysis can be accomplished by thermal conductivity, gas chromatography and the like. A better understanding of the invention will be obtained upon reference to the accompanying drawings which diagrammatically illustrate the invention.

Figure 2:
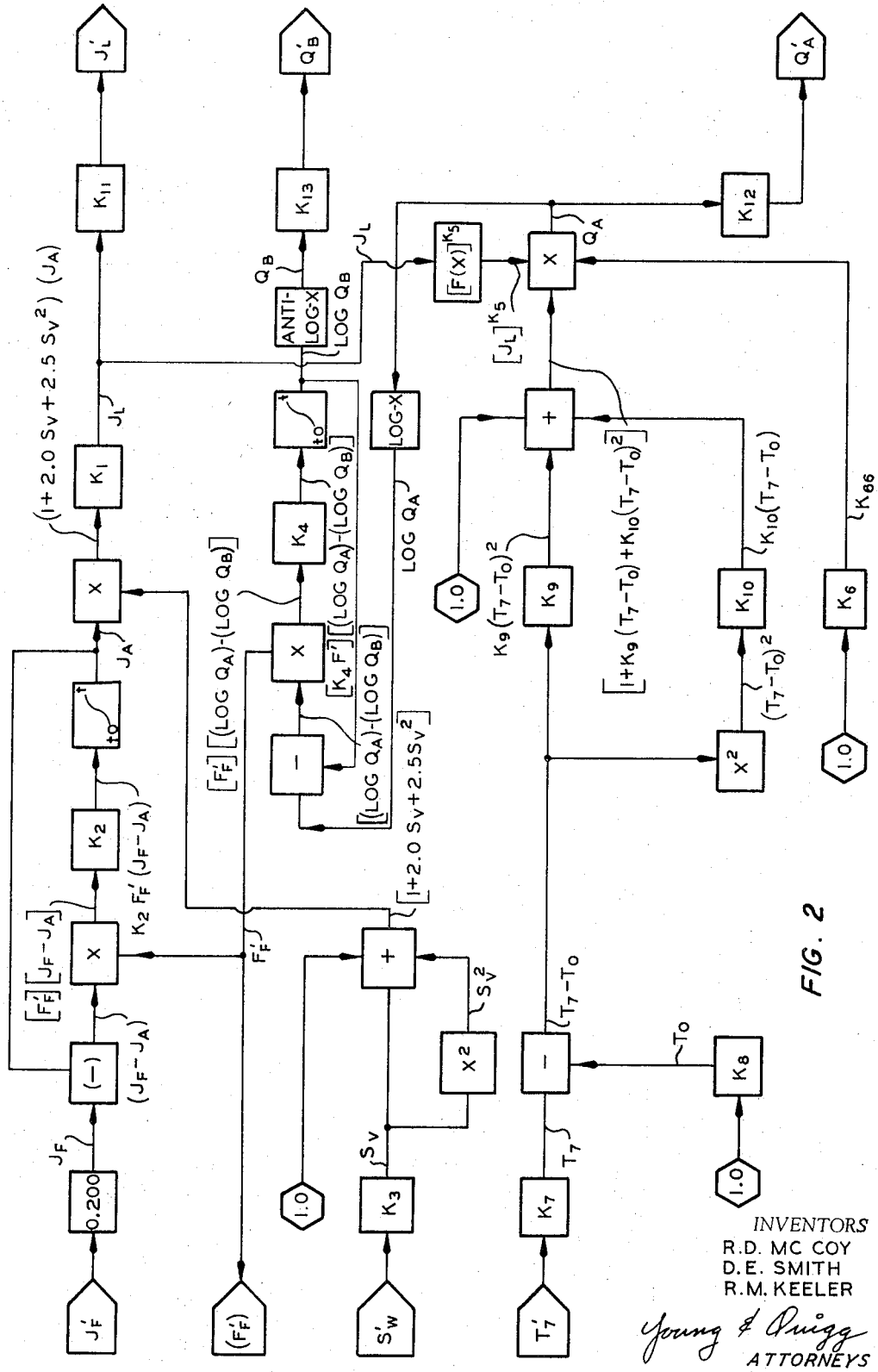
Figure 3:
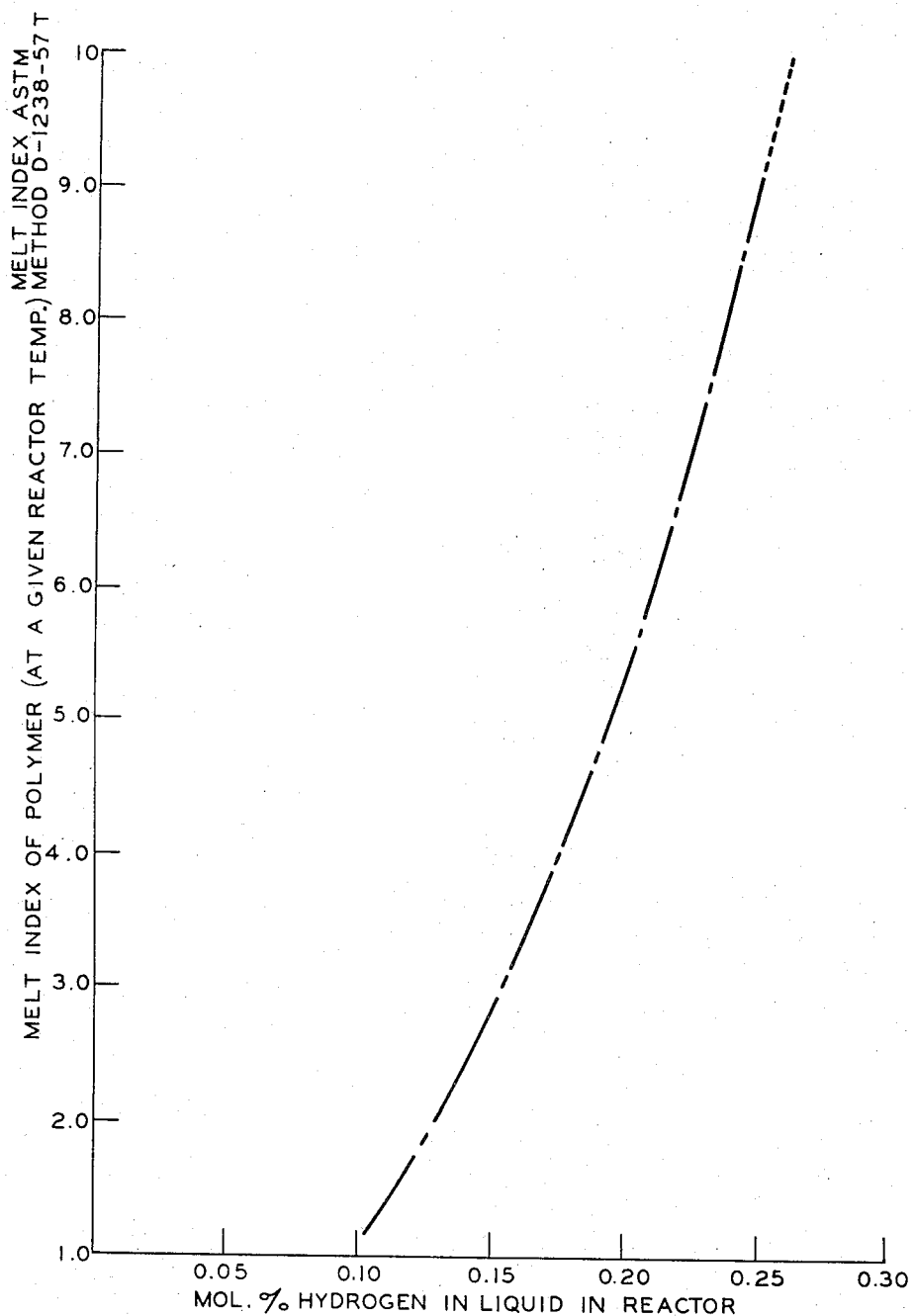
Figure 4A:
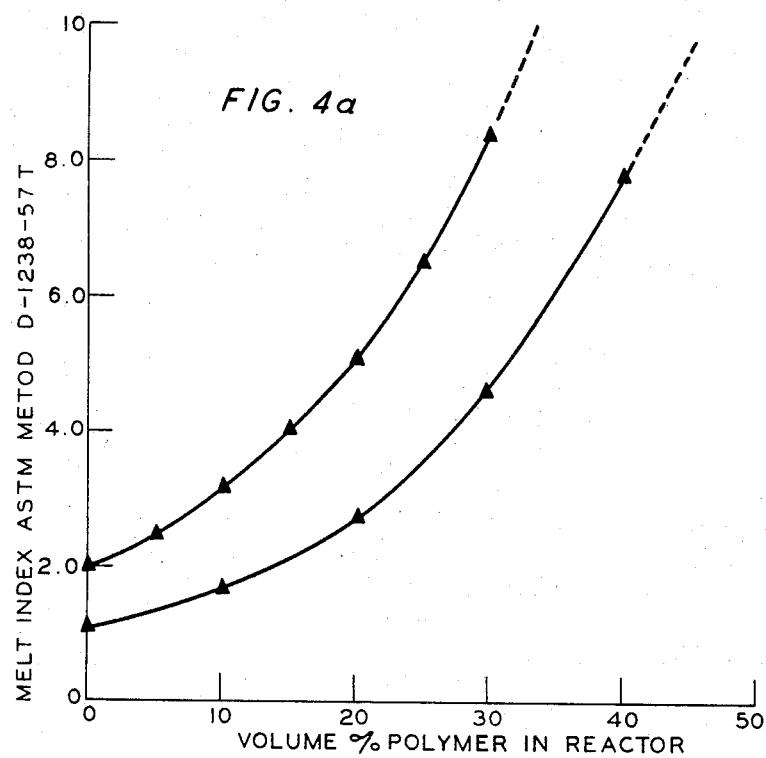
Figure 4:
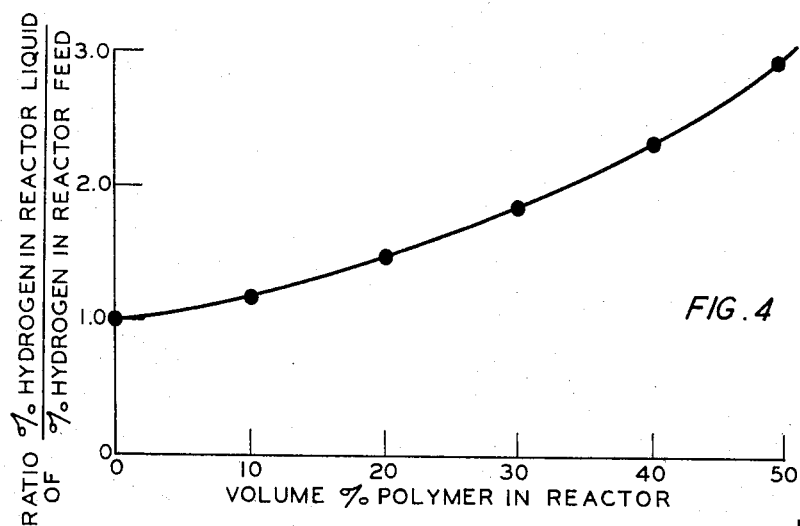
Figure 5:
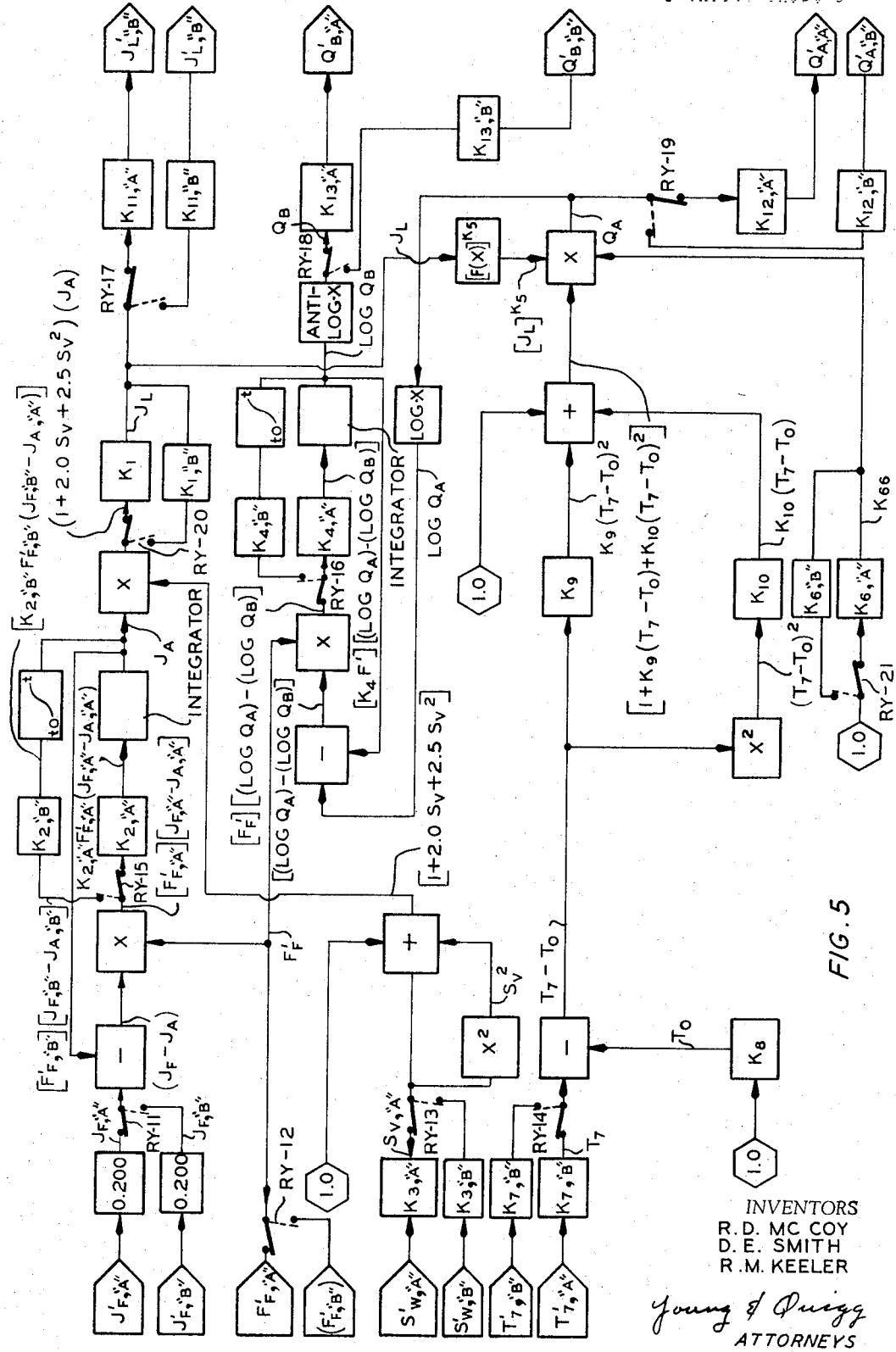

In FIGURE 1, the control system of the invention is illustrated in connection with the polymerization of propylene in a pipe loop reactor in the presence of a controlled amount of added hydrogen and an organometallic catalyst. FIGURE 2 diagrammatically illustrates a schematic circuit diagram of elements or components of computer 39 employed in the control system illustrated in FIGURE 1. FIGURE 3 graphically illustrates a plot of polymer melt index vs. hydrogen concentration in the reaction liquid phase for the process of FIGURE 1. FIGURES 4 and 4a graphically illustrate the effect of percent polymer solids on both (1) percent hydrogen in the reactor liquid and (2) melt index in the process of FIGURE 1. FIGURE 5 diagrammatically illustrates a schematic circuit diagram of components for an alternative computer 39 whereby signals from two or more reactors are passed to the computer sequentially and computations are made on a "time-sharing" basis.

For a further description of the invention, reference is now made to FIGURE 1 which shows schematically a pipe loop reactor 10 which is equipped with agitator 11 driven by motor 12 connected to a power source (not shown). The reactor is also equipped with a heat exchange jacket 13. The jacket is part of a coolant circulation system which includes conduit 14 through which coolant is introduced into jacket 13 and conduit 15 through which coolant is removed from jacket 13.

Reactor 10 is also equipped with conduit means 16 for feeding monomer, hydrogen, and catalyst to the reactor. The catalyst components are introduced into feed conduit 16 by way of conduit means 17 and 18, respectively. The rate of catalyst introduction into reactor 10 is controlled in response to the production rate computed by means 19 described in more detail hereinbelow. In the polymerization of propylene, one catalyst component can be diethylaluminum chloride and the other catalyst component can be a titanium chloride, e.g., aluminum-reduced titanium tetrachloride. Liquid propylene, which can include both fresh and recycle propylene, is passed by way of line 20 into mixer or sparger 21 and then through conduits 27 and 16 to reactor 10. The flow of liquid monomer passed to reactor 10 is regulated by flow control valve 22 responsive to rate of flow controller 23. Hydrogen is introduced into sparger 21 by way of conduit 24 and the rate of introduction is controlled by flow control valve 25 in response to flow controller 26. The stream comprising propylene and hydrogen is passed by way of lines 27 and 16 to reactor 10 wherein polymerization is effected. Reaction effluent is withdrawn through line 28 and passed to contactor 29 wherein the effluent is contacted with catalyst deactivating material introduced by way of line 30 into line 28. The treated reaction effluent is removed from contactor 29 through line 31 and passed to wash column 32 wherein the reaction effluent is countercurrently contacted with a wash liquid, e.g., propylene, introduced by way of line 33. Washed polymer product is removed from zone 32 by line 34 and wash liquid overhead by way of line 35.

According to one control concept of the invention, the concentration of hydrogen in propylene monomer stream 27 passed to the reactor is determined by hydrogen analyzer 36 from an analysis of sample stream 37. The addition of hydrogen to sparger 21 by way of line 24 is controlled by control valve 25 responsive to a signal related to the difference between the actual hydrogen flow rate in line 24, and the desired predetermined set hydrogen flow rate demanded of flow controller 26 by its set point which is manipulated by analyzer-recorder-controller 38. Hydrogen analyzer 36, through line 37, measures the hydrogen concentration in line 27 and produces a signal representative of the hydrogen concentration which is transmitted via line 41 to an analyzer-recorder-controller 38 which, after comparison with its set point (desired value), line 46, transmits a control signal, line 38a, to flow controller 26 directing it to allow more or less hydrogen to be introduced into the system depending upon the direction and magnitude of the difference between the measured hydrogen concentration and the desired predetermined set concentration. The hydrogen, probably gas of high purity which can contain or be contained in propylene, if desired, is introduced into the system by line 24 and the solution of two materials, i.e., hydrogen and propylene, dispersed and dissolved by sparger 21 is then passed to the reaction zone 10 via lines 27 and 16. Hydrogen analyzer 36 can be a thermal conductivity cell, a vapor-phase chromatographic analyzer, or other suitable hydrogen analyzing means.

According to the invention, it has been found that the melt index, both the instantaneous melt index value of the polymer in the reaction zone and the melt index value of the effluent, can be determined by automatically computing these melt index values from the input data of various process variables of the reaction system. The computer inputs include (1) concentration of hydrogen in the monomer feed, (2) polymer concentration (percent solids) in the reactor system, (3) temperature of the reaction mixture, (4) rate of flow of the monomer to the reactor, and (5) a time factor to compensate for delay. It is also within the scope of the invention to use production rate as an input signal. Thus, according to the invention, the regulation of hydrogen feed rate is accomplished in response to a hydrogen analysis in the feed corrected to indicate the hydrogen concentration in the liquid phase in the reactor. In addition, output signals representative of the melt index of the polymer in the reaction effluent and the concentration of hydrogen in the reaction liquid are obtained.

The control system of the invention employs as a basic unit thereof computer 39 which is adapted to receive input signals representative of the flow rate of propylene fed to the reactor system, the hydrogen concentration in the propylene feed, the temperature of the reaction liquid in reactor 10, and the percent solids (percent polymer) in the reaction mixture in reactor 10. The signal representative of the flow rate of propylene in line 20 is transmitted by way of line 40 to computer 39. A signal representative of the hydrogen concentration in line 27, as sensed by hydrogen analyzer 36, is transmitted by way of lines 41 and 41a to computer 39. The signal representative of the temperature of the reaction contents in reactor 10 is transmitted by way of line 42 to computer 39. The signal representative of the polymer concentration (percent solids) is transmitted by way of line 43 to computer 39. A signal representative of production rate can be transmitted from line 49 to computer 39 by means not shown in FIGURE 1 when desired. The details of the circuits and connections which make up computer 39 are described in detail in connection with FIGURE 2 hereinbelow. Computer 39 accepts the input signals from the primary measurement devices as transmitted through lines 40, 41a, 42 and 43 and produces three principal output signals that are linearly proportional to the following process variables: (1) an output signal representing the concentration of hydrogen in the reaction liquid phase; (2) an output signal representing the instantaneous or presently-being-produced melt index of the polymer in the reactor reaction mixture and (3) an output signal representing the integrated melt index of the polymer in the effluent stream removed from reactor 10 by line 28. Computer 39 automatically combines the input signals as set forth below in connection with FIGURE 2 to produce control output signals that are proportional to the instantaneous melt index, concentration of hydrogen in the reaction liquid phase, and the melt index of the polymer in the reaction effluent in response to the input signals.

A first control output signal proportional to the melt index of the polymer being produced at any instant within reactor 10 (instantaneous melt index) is transmitted by way of line 44 to melt index-recording-controller 45. The computed instantaneous melt index is compared by controller 45 with a predetermined desired polymer melt index value (set point) and a signal representative of this comparison is transmitted by way of line 46 to manipulate the set point of analyzer-recorder-controller 38. ARC–38 in turn via line 38a manipulates the set point of FRC–26 for control of hydrogen addition rate by way of line 24. The addition of hydrogen to sparger 21 by way of line 24 is, thus, controlled responsive to changes in the instantaneous melt index as computed by computer 39. By so operating, the concentration of hydrogen in reactor 10 is maintained at a value capable of producing a polymer product having a predetermined melt index by allowing the signal in line 46 to increase the hydrogen concentration set point when the computed instantaneous melt index is less than the predetermined melt index value and decrease the amount of hydrogen introduced (hydrogen concentration set point) when said instantaneous melt index value is greater than the predetermined melt index value set on controller 45.

According to the control system of the invention, corrections are made to maintain the hydrogen concentration in the reaction liquid phase, i.e., propylene, within very narrow limits of the desired value as set forth above, thereby maintaining the polymer properties especially melt index at desired values. The control system of the present invention is particularly advantageous for use in polymerization processes such as described, since, for given reaction systems, there exists a correlation between polymer properties, hydrogen concentration and reaction temperature of the reaction liquid phase. Therefore, once this correlation has been determined, polymer of the desired melt index properties can be produced by merely adjusting the set points on MIRC–45 and thereby on ARC–38 at given reaction temperatures. As indicated above, melt index is very sensitive to changes in hydrogen concentration and reaction temperature of the liquid phase within the reactor. This is graphically illustrated in FIGURE 3. This hydrogen concentration, in turn, is dependent on (1) hydrogen concentration in the propylene feed and (2) percent polymer (solids) in the reactor. FIGURES 4 and 4a graphically illustrate the effect of percent solids on both (1) percent hydrogen in the reactor liquid and (2) melt index (at a given hydrogen concentration in the reactor feed stream). The percent solids, in turn, is dependent on (1) propylene feed rate and (2) production rate.

The present invention provides a control system wherein rapid corrections can be made to maintain the hydrogen concentration of the liquid monomer phase in the reaction system within very narrow limits above and below a desired value, e.g., 0.15±0.002 mol percent, thereby maintaining the polymer properties and productivity at certain desired values. Moreover, the pipe loop reactor, for example, described in the above embodiment, also offers certain advantages over other reaction systems such as (a) higher production rates due to higher percent of solids in the reaction phase, (b) more uniform particle size of polypropylene product, (c) no appreciable reactor failing due to polymer deposition and (d) substantial elimination of the interdependence of temperature, pressure, and hydrogen concentration within the reaction system.

FIGURE 2 diagrammatically illustrates the various computing channels in computer 39 for determining output signals $J'_L$, $Q'_B$, and $Q'_A$, the mol percent hydrogen (concentration) in the reaction liquid phase, the melt index of the polymer in the product effluent stream, and the instantaneous melt index of the polymer being formed by the reaction mixture, respectively. The input signals to computer 39 are as follows:

$J'_F$=signal transmitted by line 41a representative of the mol percent hydrogen (concentration) in the reactor feed stream, $F'_F$=signal transmitted by line 40 representative of the flow rate (g.p.m.) of monomer in feed stream 20, $S'_W$=signal transmitted by line 43 representative of the weight percent solids (percent polymer) in the reaction liquid, and $T'_7$=signal transmitted by line 42 representative of the temperature of the reaction mixture in reactor 10.

Input signals $J'_F$, $F'_F$ and $S'_W$ are fed through the top computing chain of FIGURE 2 to determine the mol percent hydrogen (concentration) in the reactor liquid phase ($J'_L$). The output signal $J'_L$ from computer 39 is computed according to the following equations in the top chain of FIGURE 2 (first computing channel).

This material balance of hydrogen into and out of the reaction system assumes an insignificant amount of hydrogen is consumed or liberated, during the formation of solid polymer. Thus all hydrogen is assumed to stay in the liquid phase propylene of the reactor ring.

$$J_L = (1 + 2.0 S_v + 2.5 S_v^2)(J_A)(K_1) \quad \text{(Equation 1)}$$

wherein $J_L$=the mol percent of hydrogen (concentration) in the liquid hydrocarbon phase of the slurry in the polymerization reactor (the term $1 + 2.0 S_v + 2.5 S_v^2$ is a convenient truncated approximation for the fraction $(1 + S_v)/(1 - S_v) = 1 + 2 S_v + 2 S_v^2 + 2 S_v^3 + \ldots$ with sufficient accuracy for $0 \leq S_v \leq 0.30$), $J_A$=mol percent hydrogen (concentration) in the reactor, $S_v$=volume percent solids in the reactor, $K_1$=scaling coefficient potentiometer to compensate for various full scale calibrations of the analyzer providing input signal $J'_F$ (Manually adjustable parameter).

$$\frac{d}{dt}(J_A) = (K_2 F'_F)(J_F - J_A)$$

(Equation 2)

wherein $J_F$=mol percent hydrogen in the reactor feed stream, $F'_F$=signal from FRC–23 representative of the volumetric flow rate of total propylene feed to the reactor, $K_2 = K_4$=scaling potentiometers, each to serve two functions as follows: (1) compensate for various full scale calibrations of flow transmitter which supplies signal $F'_F$, and (2) scale the dynamic reactor feed rate signal $F'_F$ to provide dynamic time constants of the two first order lags of the computer closely approximating the actual time constants of the process. ($K_2$ and $K_4$ are manually adjustable.)

$$J_F = (0.200)(J'_F) \quad \text{(Equation 3)}$$

$$K_2 = K_4 = \left[\frac{1}{V_7(1+S_v)}\right]\left[\frac{F_F}{F'_F}\right]$$

(Equation 4)

wherein $F_F$=volumetric flow rate of total feed stream (monomer) to the reactor, and 0.200=an algebraic scale factor corresponding to physical scaling of analog signals.

$V_7$=volume of reactor.

$$K_2 F'_F = \frac{F_F}{(V_7)(1+S_v)} \quad \text{(Equation 5)}$$

$$K_4 F'_F = \frac{F_F}{(V_7)(1+S_v)} \quad \text{(Equation 6)}$$

$$S_v = K_3 S'_W \quad \text{(Equation 7)}$$

wherein $S'_W$=signal from analyzer determining weight percent solids (polymer) in the reactor;

$K_3$=scaling coefficient potentiometer to serve two functions as follows: (1) compensate for various full scale calibrations of the instrument which provides input signal $S'_W$ and (2) convert the input signal $S'_W$ from weight percent polymer solids in the reactor to volume percent $S_v$ of polymer solids in the reactor (manually adjustable parameter).

$$J'_L = K_{11} J_L \quad \text{(Equation 8)}$$

wherein $J'_L$=computer output signal representing mol percent hydrogen (concentration) in the reactor liquid phase;

$K_{11}$=scaling potentiometer permitting adjustment of percent hydrogen full scale range represented by the computer output signal $J'_L$ (manually adjustable parameter).

As indicated above, the signal representing mol percent hydrogen in the reactor liquid phase ($J'_L$) is passed by way of line 47 to a hydrogen concentration recorder (percent $H_2R$).

A signal ($T'_7$) representative of the reaction mixture temperature and a signal ($J_L$) representative of the mol percent hydrogen (concentration) in the liquid hydrocarbon phase in the reactor are passed to a second computing channel wherein the instantaneous polymer melt index ($Q_A$) is determined. The following equations are solved in the second computing channel to determine the instantaneous melt index of the polymer;

$$Q_A = [(K_{66})(J_L)K_5(T_F)] \quad \text{(Equation 9)}$$

wherein $Q_A$=melt index of polymer being formed (instantaneously) in the reactor, under the existing reactor conditions, $T_F$=a "temperature correction term" in Equation 9 developed within the computer by Equation 11 from input signal $T'_7$ and reference temperature $T_0$ to automatically adjust the computed value of $Q_A$ as a function of the fluid temperature $T_7$, $T_7$=temperature of reaction fluid in the reactor, and $T'_7$=signal from temperature transmitter representing temperature of reaction fluid in the reactor.

Additional equations involved in the $Q_A$ computing channel include:

$$\text{Log } Q_A = [\log K_{66} + (K_5)(\log J_L) + (\log T_F)] \quad \text{(Equation 10)}$$
$$T_F = [1 + K_9(T_7 - T_0) + K_{10}(T_7 - T_0)^2] \quad \text{(Equation 11)}$$
$$\text{Log } T_F = \log[1 + K_9(T_7 - T_0) + K_{10}(T_7 - T_0)^2] \quad \text{(Equation 12)}$$
$$T_7 = K_7 T'_7 \quad \text{(Equation 13)}$$
$$T_0 = (K_8)(1.0) \quad \text{(Equation 14)}$$
$$\text{Log } K_{66} = K_6(1.0) \quad \text{(Equation 15)}$$
$$Q'_A = K_{12} Q_A \quad \text{(Equation 16)}$$

wherein the manually adjustable K values in the above formulas are as follows:

$K_5$=potentiometer for adjusting exponent of the term $J_L$ in Equation 9, $K_6$=scaling potentiometer for adjusting coefficient $K_{66}$ in Equation 9, $K_7$=scaling coefficient potentiometer to compensate for various full scale calibrations of temperature measuring device developing input signal $T'_7$, $K_8$=scaling coefficient potentiometer to convert a fixed reference temperature signal $T_0$ corresponding to a predetermined reference temperature, $K_9$=scaling coefficient potentiometer to adjust the "weighting factor" for the $(T_7-T_0)$ term of Equation 11, $K_{10}$=scaling coefficient potentiometer to adjust the "weighting factor" for the $(T_7-T_0)^2$ term of Equation 11, $K_{12}$=scaling potentiometer to permit adjustment of full scale range of polymer melt index in the reactor as represented by full scale range of computer output signal $Q'_A$, $Q'_A$=computer output signal representing $Q_A$, the "instantaneous melt index" output, and $J_L$ and $T'_7$ are as previously defined.

The instantaneous melt index value represented by computer output signal $Q'_A$ is passed by way of line 44 to melt index-recording-controller MIRC–45 for comparison with a pre-set desired melt index which comparison in turn is used to produce and transmit a signal to manipulate the hydrogen concentration set point of ARC–38.

The instantaneous polymer melt index computed in the second computing channel ($Q_A$ channel) is passed to a third computing channel ($Q_B$ channel) and combined with the signal representative of the flow rate of propylene in the feed stream ($F'_F$) in the third computing channel for determination of the melt index of the polymer in the effluent polymerization stream 28. Formulas involved in the third computing channel are as follows:

$$Q_B = \text{antilog}[\log(Q_B)] \quad \text{(Equation 17)}$$

wherein $Q_B$=the melt index of the polymer in the effluent stream removed from reactor 10. Other equations in the channel include:

$$\frac{d}{dt}(\log Q_B) = [K_4 F'_F][(\log Q_A) - (\log Q_B)] \quad \text{(Equation 18)}$$

$$Q'_B = K_{13} Q_B \quad \text{(Equation 19)}$$

wherein $K_4$=scaling potentiometer as described in connection with Equations 2 and 4, $K_{13}$=scaling potentiometer to permit adjustment of the full scale range of polymer melt index represented by full scale range of computer output signal $Q'_B$, and $Q'_B$=the signal representative of melt index of the polymer in the effluent stream removed from reactor 10. The output signal $Q'_B$, which is linearly proportional to $Q_B$, the melt index of the polymer in the effluent stream, is transmitted by way of line 48 to a melt index-recorder (MIR).

The equations given above for the third computing channel assume a steady-state or constant polymer production rate during changes of MI being produced. These equations also utilize an empirically verified assumption that the MI of a blend of two or more batches of polymer can be accurately predicted as being proportional to the logarithm of the MI and the amount of the respective batches of polymer.

Equations for a more precise computation of MI effluent at non-steady polymer production rate would include the following basic steps which are not shown: (1) combine the instantaneous polymer production rate with the logarithm of the instantaneous MI signal $Q_A$ to obtain a pounds-log MI production rate signal; (2) use the analog computer to solve appropriate differential equations to analogously blend the pounds-MI of polymer; and (3) divide the pounds-MI of polymer in the reactor effluent stream by the gravimetric rate, pounds per minute, of polymer in the effluent stream to obtain the MI effluent.

Referring to FIGURE 1, the control system of the invention also employs as a basic complementary unit thereof a product production computer 19 which is adapted to receive input signals representative of the quantity of heat removed from reactor 10 and the coolant flow rate and coolant temperature of heat exchange fluid passed through cooler 13 and thereby compute the rate at which polymer is produced within the reactor for an exothermic polymerization process. The catalyst addition rate is controlled responsive to the computed polymer production rate and its desired value and a second computer 60 is adapted to receive input signals representative of the instantaneous flow rates of catalyst components and adapted to produce an output signal for manipulating the addition of chemical additives to the reactor effluent. The flow rates of one or more chemical additives are individually manipulated or controlled responsive to the computer output signals which are based upon the integrated charge rates of the initiator system components. The time lag or time constant introduced into computer 60 can either correspond to a fixed reactor residence time or can be a modifying signal representative of monomer (propylene) feed rate or of volumetric flow rate of fluid from the reactor.

The heat of reaction removed from reactor 10 is sensed by a suitable temperature measuring device which senses the difference in temperature of the coolant influent in line 14 and the temperature of the coolant effluent in line 15. A signal representative of this difference is passed by line 15a to computer 19. A signal representative of coolant flow through exchanger 13 is passed by line 14a to computer 19. The flow of coolant in line 14 is controlled by valve 14b which is set by TRC–42a to maintain a constant reaction temperature. Computer 19 establishes an output signal which is representative of the rate at which this heat of reaction is removed from the reactor, which is in turn representative of the rate of polymer production. The output signal from computer 19 is applied through line 49 to a production rate recording controller PRRC–50 where it is compared with a desired value of production rate, pounds of polymer per hour, put into the controller as set point 71. PRRC–50 is any automatic controller suitable for converting the electrical signal received, for example, to mechanical, hydraulic, pneumatic or an electrical control signal which is then applied as the set point to a speed controller SRC–51 and a flow recording controller FRC–52 through ratio relay 54 by way of line 53. Ratio relay 54 produces the set point signal passed to FRC–52 so that a predetermined desired ratio of one catalyst component to a second catalyst component is passed to reactor 10. SRC–51 controls the rate at which one catalyst component is introduced into the system through line 17 by regulating the speed of feeder 55 as sensed by the transmitter via line 57, and FRC–52 controls the rate at which the second catalyst component is introduced into the system through line 18 by regulating the speed of motor-driven pump 56 responsive to the comparison of the desired and actual production rates, the latter being computed by computer 19. The assembly shown regulates the catalyst feed rate in response to polymer production rate within the reactor. Should catalyst activity decline, production rate would likewise tend to decline so that a change in production rate would be indicated by a reduced output signal from computer 19 as well as PRRC–50 and line 53 which in turn affects the settings of SRC–51 and FRC–52 so that an increased quantity of catalyst is introduced to the reactor, thus returning the production rate to its normal desirable value.

A signal proportional to the rate of flow of catalyst addition through line 17 to the reactor is passed from transmitter by way of line 57 to computer 60. A measurement signal proportional to the flow rate of catalyst introduced through line 18 is passed by way of line 58 to computer 60. A third input signal passed to computer 60 comprises manually set signal or set points 60a and 60b. The set points represent the desired ratio of each additive (mols) to total mols of catalyst in the reactor effluent stream at any given time. In the specific embodiment described in connection with the drawing, one chemical is acetylacetone and the other is propylene oxide. The acetylacetone, which is a diketone, functions as a chelating agent and forms a complex with the catalyst residues in the reactor effluent. The propylene oxide functions to scavenge the acid formed by the chelating reaction between the catalyst residue in the polymerization effluent and acetylacetone. It is to be understood, however, that the invention is not to be limited by any particular chemical additives. It is broadly applicable to the introduction of any desired chemical into a reactor effluent responsive to computed values as described herein.

Referring to FIGURE 5, the computing channels of computer 39 have been modified by means of appropriate relays to accept signals and perform computations in accordance with Equations 1–19 from input signals, as described in connection with FIGURE 2, from two reactors (Reactor A and Reactor B) on a "time-sharing" basis. The output signals obtained for each reactor can be accordingly used to control hydrogen addition as described in connection with FIGURE 2. A timer (not shown) is provided to time share computer 39 with two reactors by passing signals to relays 11–21 (RY–11 to RY–21) so that appropriate computations can be made in accordance with the invention. Although FIGURE 5 illustrates computations for two reactors on a "time-sharing" basis, it should be realized that any desired number of reactors could be operated and controlled with computer 39 in accordance with the invention.

A better understanding of the invention will be obtained upon reference to the following illustrative example, which is not intended, however, to be unduly limitative of the invention.

A specific example will now be described utilizing the flow and control system of FIGURE 1. Make-up propylene and recycle propylene, which can contain some hydrogen, are introduced into sparger 21 by way of line 20. Fresh and recycle hydrogen are introduced at a manipulatable rate by way of line 24 into sparger 21. The reactor feed comprising propylene and hydrogen is removed from sparger 21 and passed by way of lines 27 and 16 to loop reactor 10. The concentration of hydrogen in line 27 is determined by chromatographic analyzer 36 which, in turn, passes a signal to ARC–38 which then transmits a signal to flow recording-controller 26 responsive thereto. ARC–38 compares the signal received from analyzer 36 with a set point value and manipulates the set point of FRC–26 when the amount of hydrogen in line 27 either falls below or rises above the set point concentration. The position of control valve 25 is adjusted responsive to the signal received from FRC–26 and thereby ARC–38 to introduce more or less hydrogen into sparger 21 responsive to the concentration of hydrogen in line 27.

Catalyst components, e.g. diethylaluminum chloride and titanium chloride complex (aluminum-reduced titanium tetrachloride), are introduced into reactor 10 by way of lines 17 and 18, respectively. Pipe-loop reactor 10 is maintained at a temperature of about 120° F. and a pressure of about 400 p.s.i.g. The reactants are continuously circulated within reactor 10 until propylene polymerizes to particulate polypropylene product. A portion of the reaction mixture comprising polypropylene product, unreacted propylene, hydrogen, and catalyst complex is continuously removed from reactor 10 via line 28 and sent to further processing as desired.

The heat generated by the polymerization reaction and removed from temperature-controlled reactor 10 is computed to provide an output signal from computer 19 which represents the rate of polymer production. The polymer production rate is controlled at a preselected value by varying the rate of catalyst introduction into the reactor. If because of the change of some variable, such as catalyst activity, the production rate tends to increase, a control signal from computer 19 transmitted through controllers 50, 51 and 52 tends to reduce the flow of catalyst to the reactor through lines 17 and 18. This alteration in catalyst flow to the reactor causes the rate of production to return to a normal desired value. Conversely, if the production rate tends to decrease, the heat of reaction likewise tends to decrease, and the control system shown increases the supply of catalyst to the reactor so that the total production rate returns to normal.

Through the combination of the percent polymer solids concentration measurement of the reactor's contents, the temperature of the reactor's contents, the flow rate of propylene feed to the reactor, and the percent hydrogen in the propylene feed, computer 30 produces output signals representative of the instantaneous polymer melt index, the melt index of the polymer in the effluent and the percent hydrogen in the reaction liquid. A signal proportional to the instantaneous melt index of the polymer in the reactor is passed to controller 45 wherein the instantaneous polymer melt index is compared with a preset value, and in response to this comparison manipulates the rate of hydrogen addition via ARC–38 and FRC–26. If the melt index tends to increase above the preset value in controller 45 (set point) indicating an increase of hydrogen concentration, or percent solids, or temperature, or all three above that combination of values necessary to produce the desired polymer melt index, the set point of ARC-38 is manipulated to produce a lower hydrogen addition rate into the propylene stream in sparger 21. Should the melt index become lower than the desired value at controller 45, the set point of ARC-38 is manipulated so as to increase the amount of hydrogen introduced into the propylene feed by sparger 21, thus resulting in an increase in melt index and a return to its desired value. It can be seen therefore that an accurate and sensitive control is provided by the invention for a continuous process to produce a polymer product having constant and uniform properties.

The use of computer 39 in the above example to compute the hydrogen concentration in the reaction liquid using the equations set forth above and the appropriate input signals of hydrogen concentration in the reactor feed, percent polymer solids in the reactor, production rate, and flow rate of monomer feed to the reactor with a convenient time constant, will give a very good dynamic and steady state computed value for a continuous, instantaneous value for hydrogen concentration in the reactor liquid phase. This will give with the control system shown in FIGURE 1 greatly improved automatic control of the hydrogen concentration ($J_L$) and melt index of the polymer produced even with relatively large and rapid variations in the input signals.

As will be evident to those skilled in the art, various modifications of this invention can be made or followed in the light of the foregoing disclosure, and discussion without departing from the spirit and scope of the disclosure or from the scope of the claims.

We claim:

1. A method for controlling a continuous polymerization reaction for production of polymer of uniform melt index wherein monomer, hydrogen, and catalyst streams are continuously fed to a reaction zone and from which a reaction effluent containing polymer, unreacted monomer, catalyst and hydrogen is removed which comprises:

determining the concentration of hydrogen in the feed to the reaction zone and producing a first measurement signal proportional thereto;

determining the polymer concentration (percent solids) of the contents of said reaction zone and producing a second measurement signal proportional thereto;

measuring the temperature of the contents of said reaction zone and producing a third measurement signal proportional thereto;

measuring the flow rate of said monomer stream and producing a fourth measurement signal proportional thereto;

automatically combining said first, second, third and fourth measurement signals to produce a first computed output signal proportional to the melt index of the polymer being produced at any instant within said reaction zone (instantaneous melt index) in response to said first, second, third and fourth measurement signals;

comparing the thus-determined instantaneous melt index value with a desired polymer melt index value; and controlling the addition of hydrogen to said reaction zone responsive to changes in said determined instantaneous melt index so as to maintain the amount of hydrogen in said zone at a desired value to produce a polymer having a desired melt index by producing a first control output signal representative of said comparison so as to increase the amount of hydrogen passed to said zone when said determined instantaneous melt index is less than said desired melt index value and to decrease the amount of hydrogen passed to said zone when said determined instantaneous melt index is greater than said desired melt index value.

2. A process according to claim 1 including the steps of:

producing a third computed output signal proportional to the melt index of the polymer in said reaction effluent in response to said first and said fourth measurement signals; and producing a computed output signal proportional to the hydrogen concentration in the reaction zone in response to said first, second and fourth measurement signals.

3. A process according to claim 1 including the steps of:

measuring the heat removed from said reaction zone by measuring the heat exchange fluid influent temperature and the heat exchange fluid effluent temperature of the heat exchange fluid passed in heat exchange relationship with the reaction mixture in said reaction zone and producing a signal proportional to the measured temperature differential;

measuring the flow of coolant to said reaction zone and producing a signal proportional thereto;

automatically combining said signals;

producing a signal proportional to the production rate of reaction product in said reaction zone responsive to said combined signals; and controlling the amount of catalyst fed to said reaction zone in response to the latter signal to maintain a predetermined production rate in said reaction zone.

4. A process for controlling a continuous polymerization reaction in a mass polymerization system containing from 0.01 to 0.80 mol percent hydrogen in the liquid phase for production of solid polypropylene having a melt index ranging from 0.1 to 10° wherein a propylene stream containing added hydrogen and a polymerization catalyst stream are continuously fed to a reaction zone maintained at a temperature in the range 90–160° F. and from which a reaction effluent stream containing solid polypropylene, unreacted propylene and hydrogen is removed which comprises:

continuously measuring the hydrogen concentration of said propylene stream and producing a first measurement signal as a function of said concentration;

continuously measuring the polymer concentration in the reaction mixture within said reaction zone and producing a second measurement signal proportional thereto;

continuously measuring the temperature of the reaction mixture within said reaction zone and producing a third measurement signal proportional thereto;

continuously measuring the volumetric flow rate of said propylene stream and producing a fourth measurement signal proportional thereto;

automatically combining said first, second and fourth measurement signals to produce a first computed output signal proportional to the mol percent of hydrogen in the liquid hydrocarbon phase of the slurry in the polymerization zone according to the formula:

$$J_L = [1 + 2.0 S_V + 2.5 S_V^2](J_A)(K_1)$$

wherein $J_L$ = mol percent hydrogen in the liquid hydrocarbon phase of the slurry in the polymerization zone, $J_A$ = mol percent hydrogen in the reaction zone, $S_V$ = volume percent solids in the reaction zone, $K_1$ = manually adjustable parameter;

automatically combining said first computed output signal with said third measurement signal to produce a second computed output signal proportional to the melt index of the polymer being formed (instantaneously) in the reaction zone under the existing reaction zone conditions according to the formula;

$$Q_A = (K_{66})(J_L)K_5(T_F)_2$$

wherein $Q_A$ = instantaneous melt index of the polymer being formed in the reaction zone, $J_L$ = as defined and determined in the preceding formula, $T_F$ = a temperature correction term to automatically adjust determined value of $Q_A$ as a function of reaction liquid temperature, and $K_{66}$ and $K_5$ = manually adjustable parameters;

comparing the thus determined instantaneous melt index value with a desired polymer melt index value within said melt index range and producing a third computed output signal related to said instantaneous melt index; and adjusting said concentration of hydrogen in said propylene stream responsive to changes in said third computed output signal so as to produce a polymer having said desired melt index by allowing said third computed output signal to increase said desired hydrogen concentration when said determined (instantaneous) melt index is less than said desired melt index value and decreasing said desired hydrogen concentration when said instantaneous melt index is greater than said desired melt index value.

5. A process according to claim 4 including the steps of:

automatically combining said second computed output signal representing the instantaneous melt index of the polymer with said fourth measurement signal representing volumetric flow rate of propylene feed to the reaction zone to produce a fourth computed output signal proportional to the melt index of the polymer in the effluent stream removed from said reaction zone;

measuring the heat removed from said reaction zone by measuring the heat exchange fluid influent temperature and the heat exchange fluid effluent temperature of the heat exchange fluid passed in heat exchange relationship with the reaction mixture in said reaction zone and producing a signal proportional to the measured temperature differential;

measuring the flow of coolant to said reaction zone and producing a signal proportional thereto;

automatically combining said latter two signals;

producing a signal proportional to the production rate of reaction product in said reaction zone responsive to said combined signals; and controlling the amount of catalyst fed to said reaction zone in response to the latter signal to maintain a predetermined production rate in said reaction zone.

6. A process for polymerizing an olefin in the presence of small controlled amounts of hydrogen so as to improve the properties of the polymer formed which comprises:

passing a stream containing monomer and hydrogen to a reaction zone;

measuring the hydrogen concentration of said stream and producing a measurement signal as a function of said concentration;

correcting said measurement signal so as to indicate the hydrogen concentration in the liquid phase in said reaction zone;

controlling the addition of hydrogen to the reaction system responsive to changes in said corrected signal so as to maintain said concentration in said stream and in said zone at a manipulated desired value; and effecting polymerization of said monomer in said reaction zone by contacting same with a catalyst and the desired amount of hydrogen under polymerization conditions so as to produce a polymer product having improved properties.

7. A process according to claim 6 wherein said corrected hydrogen analysis is a computed measurement derived from the analysis of hydrogen in the monomer feed, the percent polymer solids in the reaction zone, the temperature of the reaction mixture in the reaction zone and a time factor to compensate for delay.

References Cited

UNITED STATES PATENTS

| 3,108,094 | 10/1963 | Morgan | 260—94.9 |
| 3,146,223 | 8/1964 | Cheney | 260—94.9 |
| 3,203,943 | 8/1965 | Houser | 260—94.9 |

JOSEPH L. SCHOFER, *Primary Examiner.*

J. A. SEIDLECK, *Examiner.*

F. L. DENSON, L. EDELMAN, *Assistant Examiners.*